(12) United States Patent
Hadani et al.

(10) Patent No.: US 9,667,307 B1
(45) Date of Patent: May 30, 2017

(54) WIRELESS TELECOMMUNICATIONS SYSTEM FOR HIGH-MOBILITY APPLICATIONS

(71) Applicant: Cohere Technologies, Santa Clara, CA (US)

(72) Inventors: Ron Hadani, Austin, TX (US); Shlomo Rakib, Saratoga, CA (US)

(73) Assignee: Cohere Technologies, Santa Clara, CA (US)

( * ) Notice: Subject to any disclaimer, the term of this patent is extended or adjusted under 35 U.S.C. 154(b) by 0 days.

(21) Appl. No.: 15/146,987

(22) Filed: May 5, 2016

Related U.S. Application Data

(60) Provisional application No. 62/316,243, filed on Mar. 31, 2016, provisional application No. 62/316,298, filed on Mar. 31, 2016.

(51) Int. Cl.
*H04B 1/62* (2006.01)
*H04B 1/04* (2006.01)

(52) U.S. Cl.
CPC ............ *H04B 1/62* (2013.01); *H04B 1/0475* (2013.01)

(58) Field of Classification Search
CPC ................................ H04B 1/62; H04B 1/0475
USPC .................................. 375/260, 267, 295, 296
See application file for complete search history.

(56) References Cited

U.S. PATENT DOCUMENTS

| | | | | |
|---|---|---|---|---|
| 7,773,685 B2* | 8/2010 | Tirkkonen | ............ | H04L 1/0009 375/267 |
| 7,864,877 B2* | 1/2011 | Hottinen | ............ | H04B 7/0647 370/328 |
| 8,619,892 B2* | 12/2013 | Vetter | ................ | H04B 7/0452 375/267 |
| 2006/0008021 A1* | 1/2006 | Bonnet | ................ | H04L 1/0618 375/267 |
| 2007/0104283 A1* | 5/2007 | Han | ..................... | H04B 7/0408 375/260 |
| 2013/0058390 A1* | 3/2013 | Haas | ..................... | H04W 52/42 375/224 |
| 2014/0348252 A1* | 11/2014 | Siohan | ................ | H04L 1/0668 375/261 |

* cited by examiner

*Primary Examiner* — Freshteh N Aghdam
(74) *Attorney, Agent, or Firm* — Kaplan Breyer Schwarz, LLP

(57) ABSTRACT

A wireless telecommunications system that mitigates infra-symbol interference due to Doppler-shift and multipath. Embodiments of the present invention are particularly advantageous for wireless telecommunications systems that operate in high-mobility environments, including high-speed trains and airplanes.

20 Claims, 13 Drawing Sheets

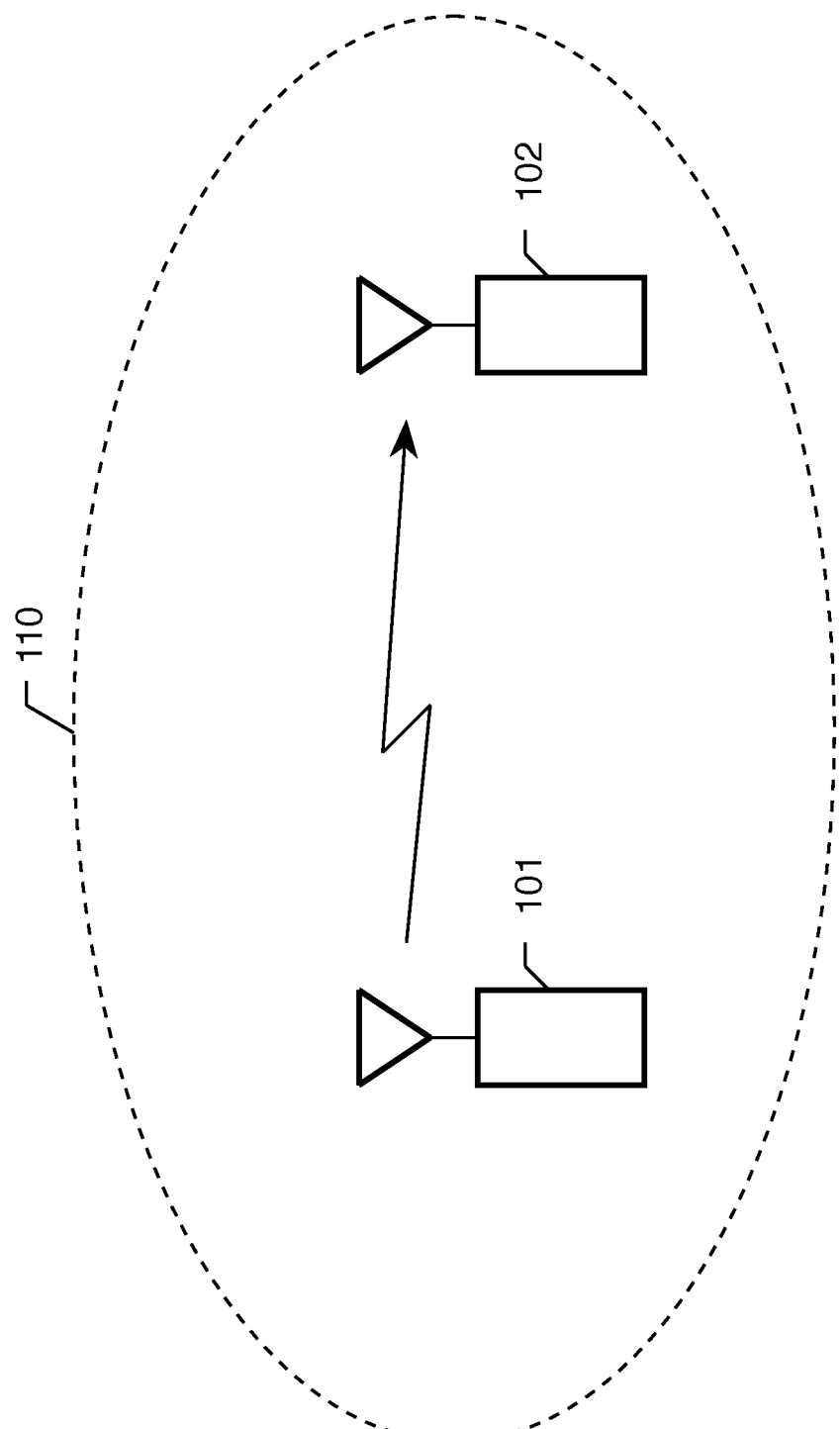

WIRELESS TELECOMMUNICATIONS SYSTEM FOR HIGH-MOBILITY APPLICATIONS

STATEMENT OF RELATED APPLICATIONS

This application claims benefit to provisional application No. 62/316,243, filed on 31 Mar. 2016, entitled "Robust Wireless Telecommunications System".

This application claims benefit to provisional application No. 62/316,298, filed on 31 Mar. 2016, entitled "Orthogonal Time Frequency Space".

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take steps to address the impairments, and in some cases the receiver addresses the impairments. In all cases, however, the nature of each impairment must be detected quickly and accurately so that it can be mitigated.

SUMMARY OF THE INVENTION

The present invention is a wireless telecommunications system that avoids some of the costs and disadvantages of wireless telecommunications systems in the prior art. In particular, the illustrative embodiment of the present invention is able to discriminate between direct-path and multipath images, which (substantially) prevents infrasymbol interference and enables the remediation of intersymbol interference. Embodiments of the present invention are particularly advantageous in radio channels with multi-path and Doppler-shift impairments.

BRIEF DESCRIPTION OF THE DRAWINGS

FIG. 1A depicts a block diagram of the salient components of wireless telecommunications system 100 in accordance with the illustrative embodiment of the present invention.

DETAILED DESCRIPTION

Figure 1B:
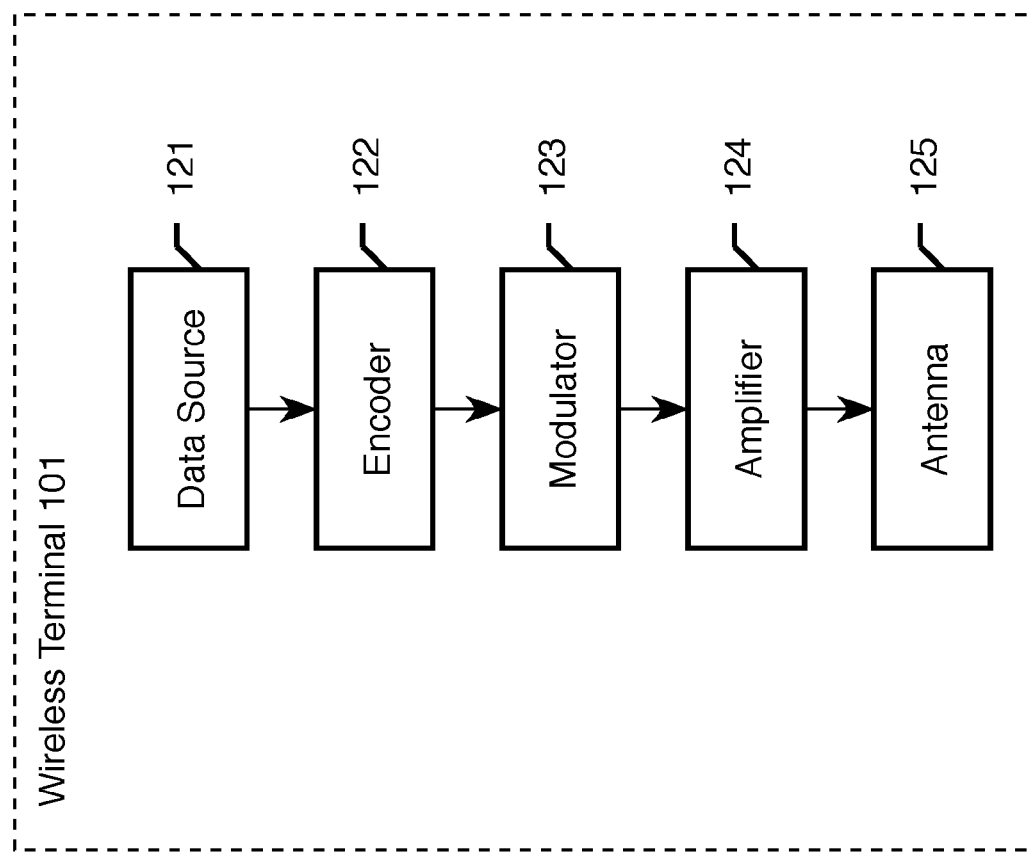
FIG. 1B depicts a block diagram of the salient components of radio 101 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises radios 101 and 102, which are both situated in geographic region 110.

In accordance with the illustrative embodiment, radio 101 transmits a modulated radio-frequency carrier signal to radio 102. It will be clear to those skilled in the art, however, after reading this disclosure, how to make and use embodiments of the present invention in which radio 101 transmits a modulated radio-frequency carrier signal to radio 102 and radio 102 transmits a modulated radio-frequency carrier signal to radio 101.

In accordance with the illustrative embodiment, radio 101 transmits a plurality of data items to radio 102, which data items represent sound, images, video, data, and signaling. It will be clear to those skilled in the art how to make radio 101 so that it can de-construct sound, images, video, data, and signaling into data items, and it will be clear to those skilled in the art how to make radio 102 so that it can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises two radios, but it will be clear to those skilled in the art, after reading this disclosure, how to make and use alternative embodiments of the present invention that comprise any number of radios.

In accordance with the illustrative embodiment, wireless telecommunications system 100 operates in point-to-point (i.e., 1:1) mode. It will be clear to those skilled in the art, however, after reading this disclosure, how to make and use embodiments of the present invention that operate in broadcast (i.e., 1:>1) mode.

In accordance with the illustrative embodiment, radios 101 and 102 are mobile, but it will be clear to those skilled in the art, after reading this disclosure, how to make and use alternative embodiments of the present invention in which each radio is either mobile or stationary.

In accordance with the illustrative embodiment, geographic region 110 comprises natural and man-made radio-frequency objects (not shown) that reflect, refract, and diffract the carrier signals that propagate from radio 101 to radio 102. Furthermore, some of the radio-frequency objects are stationary (e.g., trees, hills, buildings, etc.) and some are mobile (e.g., trucks, ships, airplanes, etc.).

In accordance with the illustrative embodiment, the parameters that characterize the signal-path impairments in the radio channel between radios 101 and 102 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, radio 101 transmits the modulated radio-frequency carrier signal to radio 102 in a channel that is B=10 MHz wide. It will be clear to those skilled in the art, however, after reading this disclosure, how to make and use alternative embodiments of the present invention in which the radio channel has different bandwidth (e.g., 2.5 MHz, 5.0 MHz, 12.5 MHz, 15 MHz, 20 MHz, 40 MHz, 80 MHz, etc.).

FIG. 1B depicts a block diagram of the salient components of radio 101 in accordance with the illustrative embodiment of the present invention. Radio 101 comprises: data source 121, encoder 122, modulator 123, amplifier 124, and antenna 125.

Data source 121 comprises the hardware and software necessary to convert external stimuli (e.g., sound, light, a user's keystrokes, etc.) and internal stimuli (e.g., radio-frequency measurements, signaling, etc.) into data items to be transmitted to radio 102. It will be clear to those skilled in the art how to make and use data source 121.

Encoder 122 comprises the hardware and software necessary to compress, encrypt, and add forward error correction to the data items generated by data source 121. It will be clear to those skilled in the art how to make and use encoder 122.

Modulator 123 comprises the hardware and software necessary to modulate a radio-frequency carrier signal with the data items from encoder 122 to generate a modulated radio-frequency carrier signal. The construction and operation of modulator 123 is described in detail herein and in the accompanying figures.

Amplifier 124 comprises the hardware necessary to increase the power of the modulated radio-frequency carrier signal for transmission via antenna 125. It will be clear to those skilled in the art how to make and use amplifier 124.

Antenna 125 comprises the hardware necessary to facilitate the radiation of the modulated radio-frequency carrier signal wirelessly through space to radio 102.

Figure 2:
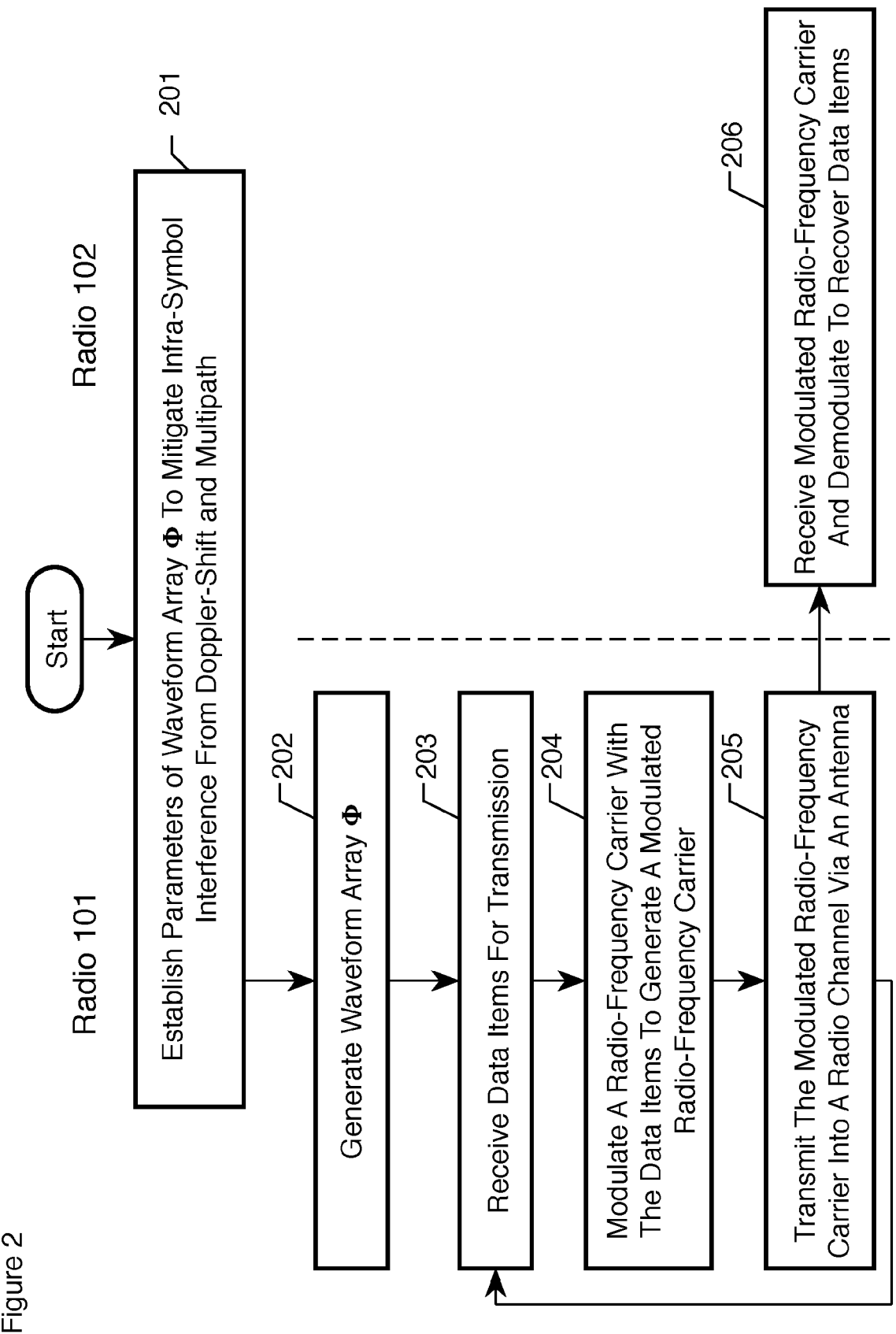
FIG. 2 depicts a flowchart of the salient tasks performed by radio 101 and radio 102 in accordance with the illustrative embodiment of the present invention.

FIG. 2 depicts a flowchart of the salient tasks performed by radios 101 and 102 in accordance with the illustrative embodiment of the present invention.

At task 201, radios 101 and 102 establish the parameters of waveform array Φ to mitigate infra-symbol interference caused by Doppler-shift and multipath interference. As will be described in detail below, waveform array Φ comprises waveforms that convey data items from radio 101 to radio 102.

In accordance with the illustrative embodiment, the parameters of waveform array Φ are established once when radios 101 and 102 first establish communication, but it will be clear to those skilled in the art, after reading this disclosure, how to make and use alternative embodiments of the present invention in which the radios periodically or sporadically re-establish the parameters of waveform array Φ. For example and without limitation, radios 101 and 102 can re-establish the parameters of waveform array Φ as:
 i. traits of the signal path from change, or
 ii. the type of data represented by the data items changes, or
 iii. the latency tolerance of the data items changes, or
 iv. any combination of i, ii, and iii.

In accordance with the illustrative embodiment, radios 101 and 102 convey data items using one waveform array Φ, but it will be clear to those skilled in the art, after reading this disclosure, how to make and use alternative embodiments of the present invention that use any number of waveform arrays (e.g., two waveform arrays Φ1 and Φ2; three waveform arrays, Φ1, Φ2, and Φ3; four waveform arrays, Φ1, Φ2, Φ3, and Φ4; etc.) to convey data items. For example and without limitation, radios 101 and 102 use different waveform arrays for:
 i. different conditions of the signal path from radio 101 to radio 102, or
 ii. different types of data items, or
 iii. different latency tolerance of the data items, or
 iv. any combination of i, ii, and iii.

Basic Waveforms—Waveform array Φ is based on an extension of M basic waveforms $b(1), \ldots, b(m), \ldots, b(M)$ that are orthogonal in M-dimensional vector space, where M is a positive integer greater than 1, and m is a positive integer in the range $m \in \{1, \ldots, M\}$.

Figure 3:
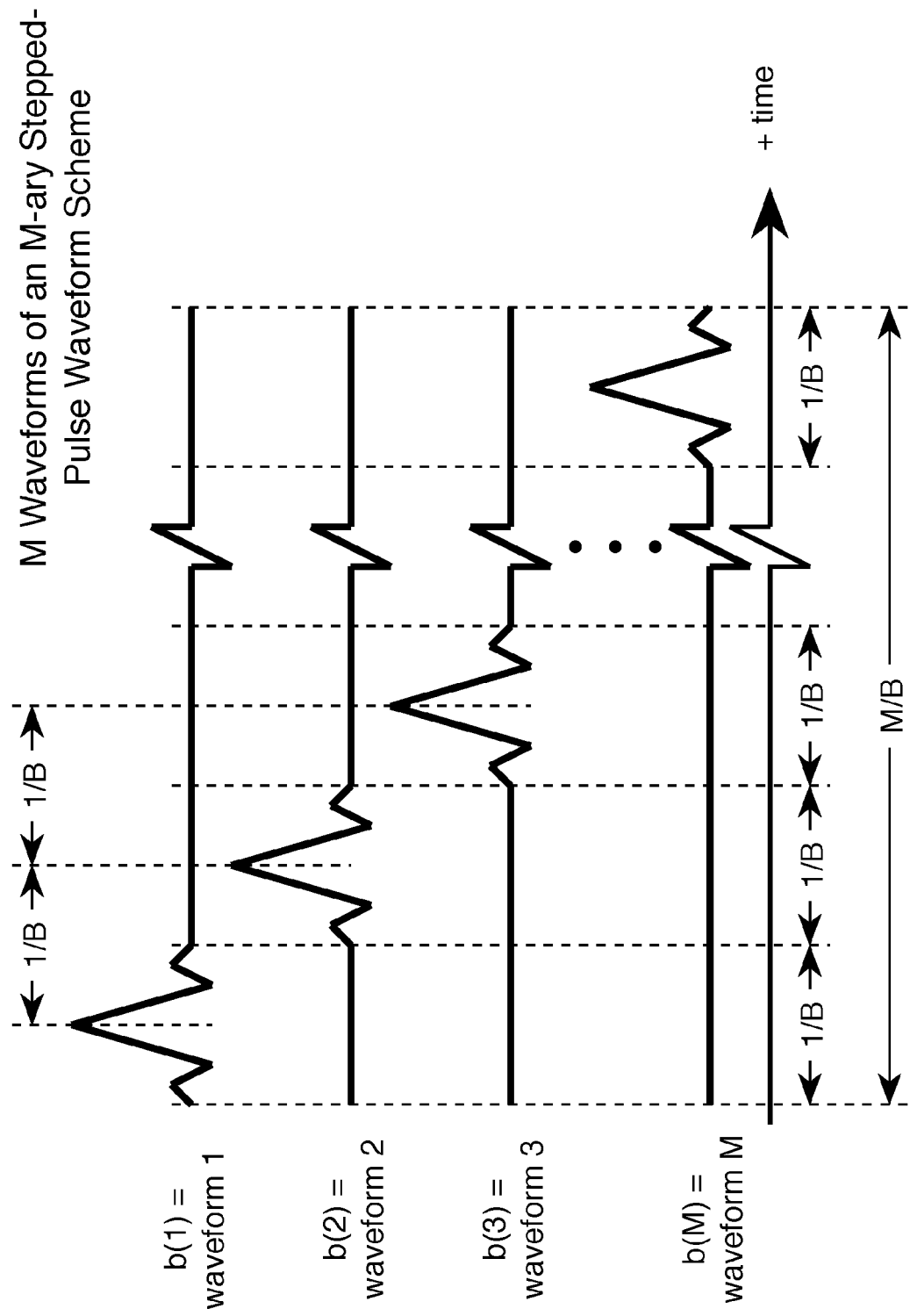
FIG. 3 depicts a waveform array $\Phi$ is based on M orthogonal M-ary stepped-pulse waveforms.

In accordance with the illustrative embodiment, basic waveform b(m) is a waveform m of a M-ary stepped-pulse waveform scheme, as depicted in FIG. 3. In accordance with the illustrative embodiment, each pulse is a band-limited raised-cosine pulse but it will be clear to those skilled in the art, after reading this disclosure, how to make and use alternative embodiments of the present invention in which each pulse has a different shape.

Each pulse in basic waveform b(m) is band-limited, and, therefore, the duration of each pulse is 1/B seconds, wherein B is the bandwidth of the channel. Furthermore, the centers of adjacent pulses are separated by 1/B seconds. And still furthermore, the total duration of each basic waveform b(m) is M/B seconds (as depicted in FIG. 3).

Although the illustrative embodiment uses stepped-pulse waveforms as the basic waveforms, it will be clear to those skilled in the art, however, after reading this disclosure, how to make and use alternative embodiments of the present invention in which waveform array Φ is based on any set of M orthogonal waveforms, $b(1), \ldots, b(M)$.

Structure of Waveform Array Φ—Waveform array Φ comprises M·N waveforms that are orthogonal in M·N-dimensional vector space, wherein N is a positive integer greater than 1. The M·N waveforms of waveform array Φ are $\phi(1,1), \ldots, \phi(m,n), \ldots, \phi(M,N)$, where n is a positive integer in the range $n \in \{1, \ldots, N\}$.

Each waveform $\phi(m,n)$ is the sum of N waveforms $y(m,n,1), \ldots, y(m,n,p), \ldots, y(m,n,N)$.

Each waveform $\phi(m,n)$ is identically partitioned into N time slots $1, \ldots, p, \ldots, N$, where p is a positive integer in the range $p \in \{1, \ldots, N\}$. Waveform $y(m,n,p)$ occupies time slot p in waveform $\phi(m,p)$ and equals:

$$y(m,n,p) = b(m) \cdot u(n,p) \quad \text{(Eq. 1)}$$

wherein u(n,p) is a phasor that equals:

$$u(n,p) = \exp(2\pi(n-1)(p-1)i/N) \quad \text{(Eq. 2)}$$

The duration of waveform y(m,n,p) defines the duration of time slot p.

Figure 4:
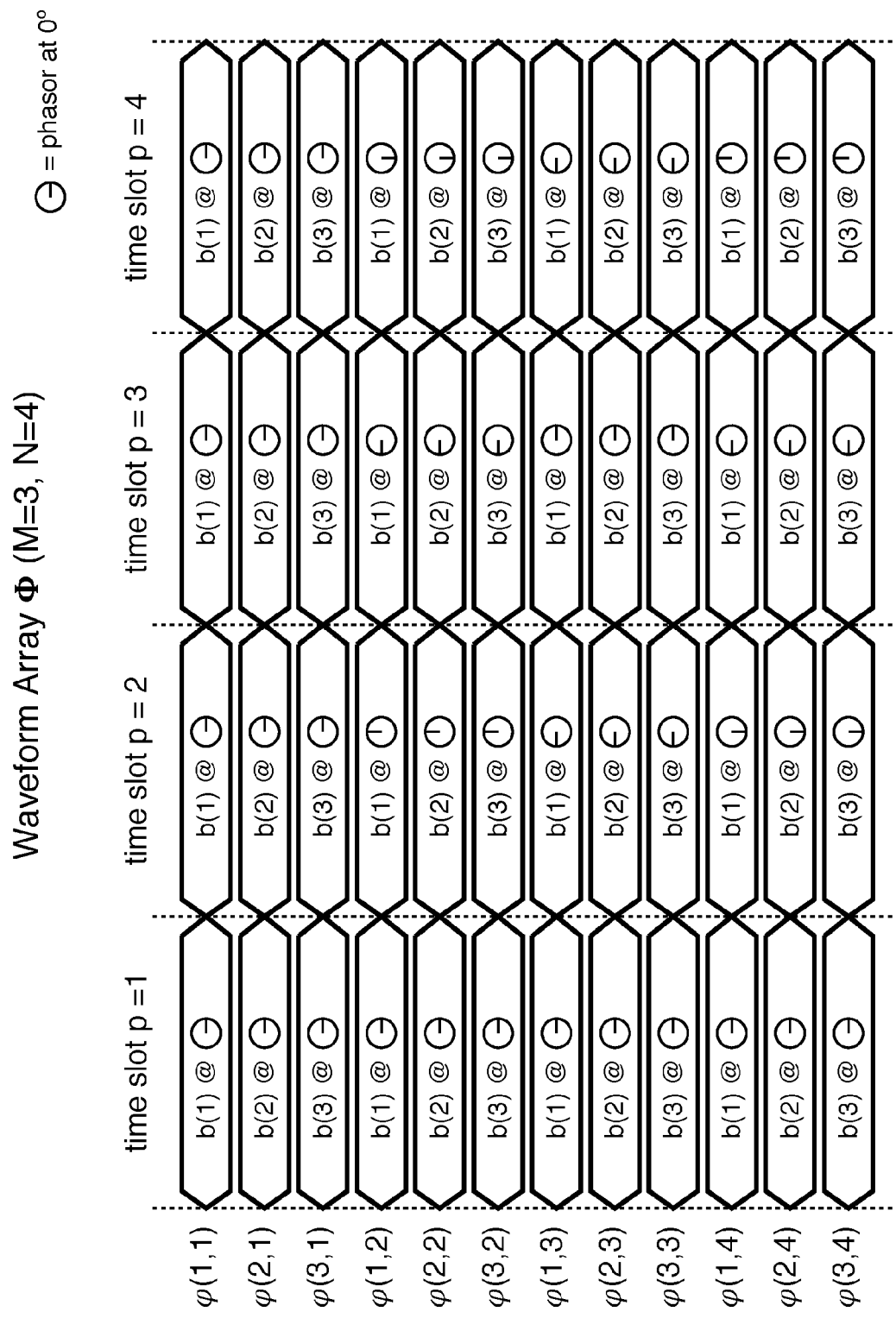
FIG. 4 depicts the composition of waveform array $\Phi$ (M=3 and N=4) for any set of orthogonal basic waveforms.
Figure 5:
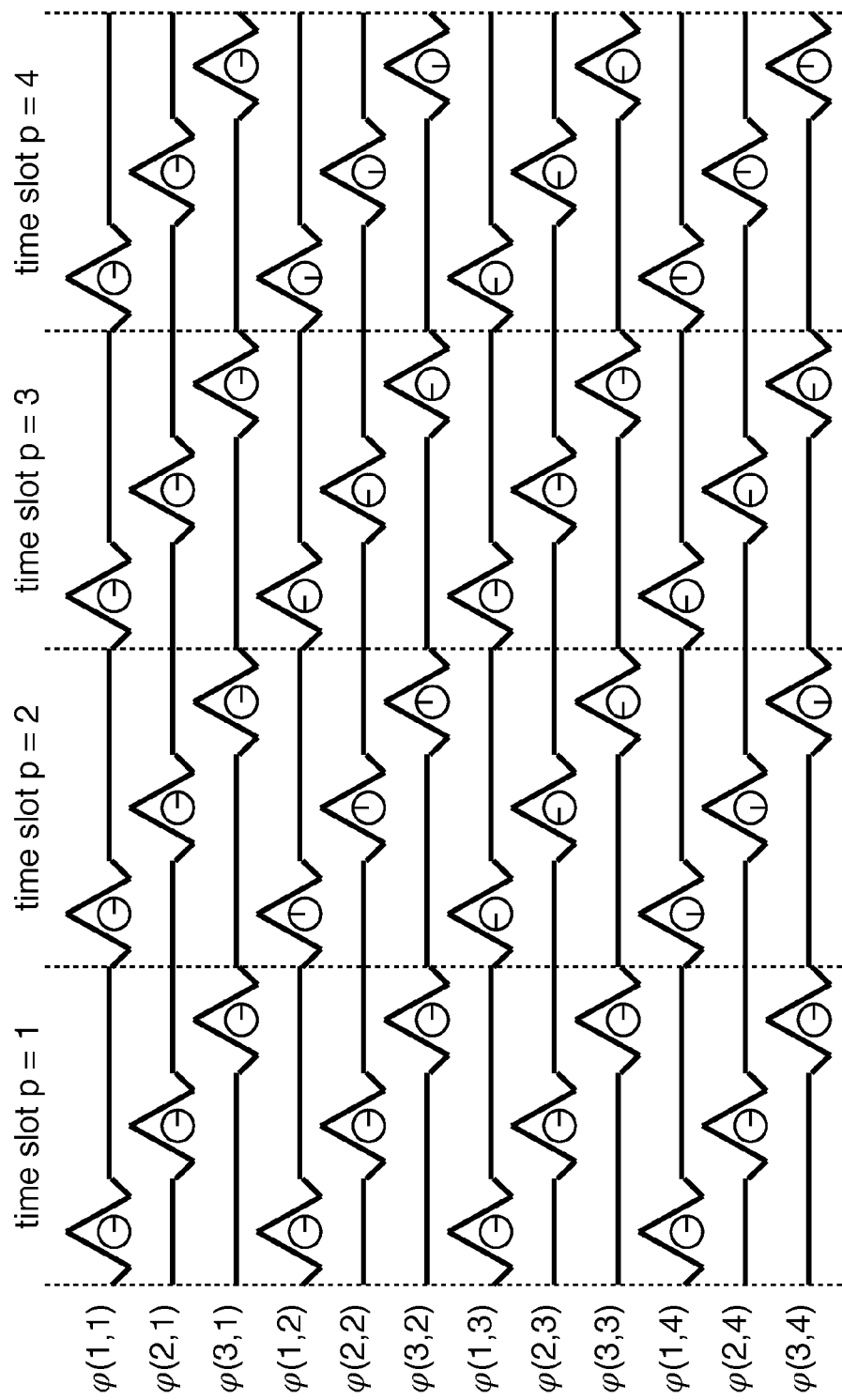
FIG. 5 depicts the composition of waveform array $\Phi$ (M=3 and N=4) for the stepped-pulse waveform.

An illustrative waveform array Φ (M=3 and N=4) is depicted in FIG. 4 and FIG. 5, and the phasors u(n,p) associated the array are depicted in Table 1.

TABLE 1

Phasors u(n,p) for Each Waveform y(m,n,p) in Waveform Array Φ (M = 3 and N = 4)

|          | time slot p = 1 | time slot p = 2 | time slot p = 3 | time slot p = 4 |
|----------|-----------------|-----------------|-----------------|-----------------|
| y(m,1,p) | 1 + 0i          | 1 + 0i          | 1 + 0i          | 1 + 0i          |
| y(m,2,p) | 1 + 0i          | 0 + 1i          | −1 + 0i         | 0 − 1i          |
| y(m,3,p) | 1 + 0i          | −1 + 0i         | 1 + 0i          | −1 + 0i         |
| y(m,4,p) | 1 + 0i          | 0 − 1i          | −1 + 0i         | 0 + 1i          |

A salient characteristic of the illustrative embodiment is that each waveform ϕ(m,n) deposits energy into:
 i. unique time-frequency portions the radio channel, and
 ii. 1/M·$N^{th}$ of the radio channel.
This is illustrated in FIGS. 6 and 7.

Figure 6:
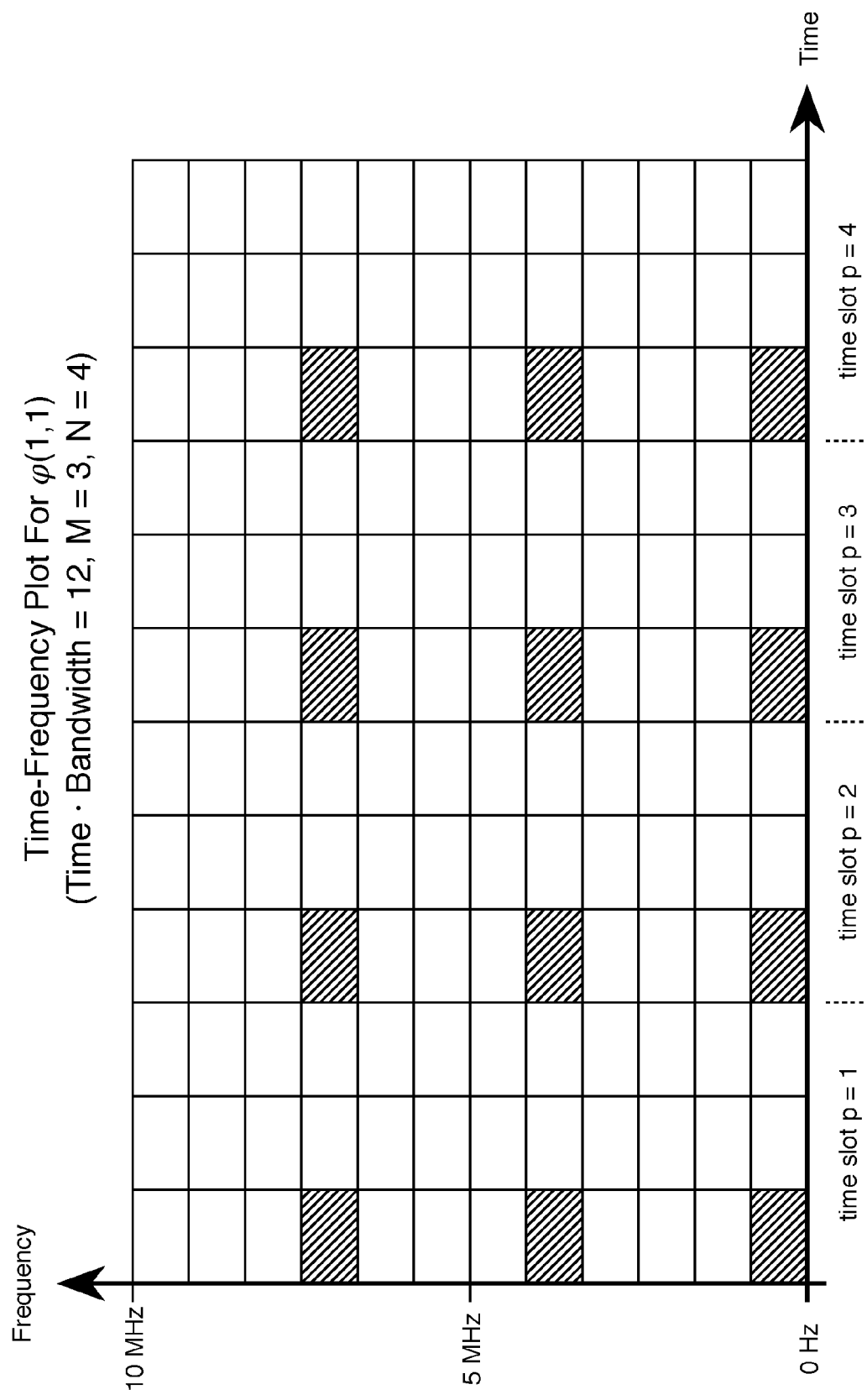
FIG. 6 depicts a time-frequency plot for one of the waveforms—waveform $\phi(1,1)$—in the illustrative waveform array $\Phi$ (M=3 and N=4).

For example, FIG. 6 depicts a plot of where the energy associated with waveform ϕ(1,1) [in waveform array Φ (M=3 and N=4)] is deposited into the 10 MHz radio channel. In FIG. 6 the radio channel depicted as divided into twelve 833.3 KHz frequency bands (B=10 MHz/M·N=12) and twelve (M·N=12) intervals. In FIG. 6, it can be seen that energy exists only in those intervals when the raised-cosine pulse exists and only in the frequency sub-bands 0-0.833 MHz, 3.333-4.167 MHz, and 6.667-7.500 MHz (i.e., the diagonally-striped blocks) in the channel.

Figure 7:
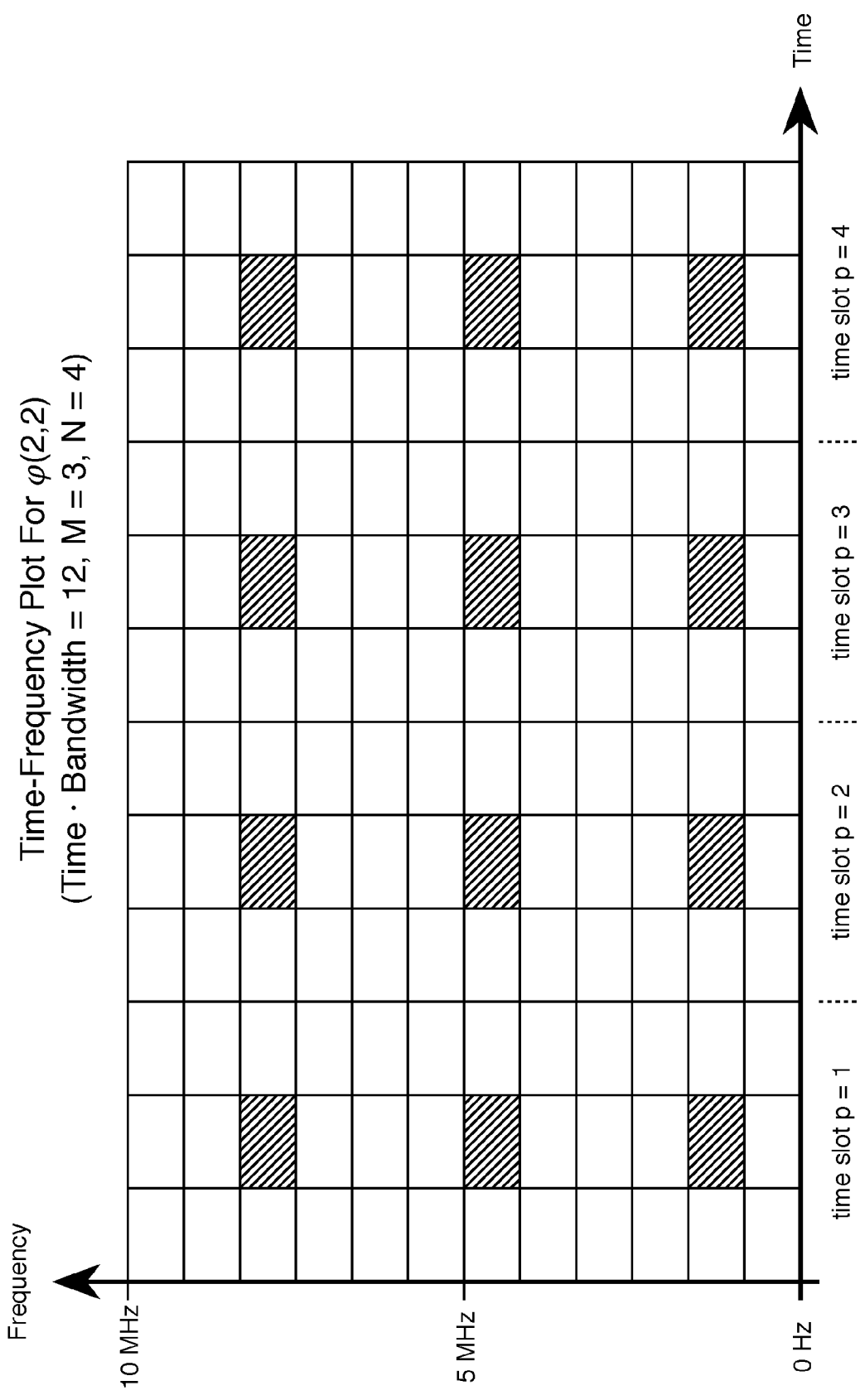
FIG. 7 depicts a time-frequency plot for a different one of the waveforms—waveform $\phi(2,2)$—in the illustrative waveform array $\Phi$ (M=3 and N=4).

Similarly, FIG. 7 depicts a plot of where the energy associated with waveform ϕ(2,2) [in waveform array Φ (M=3 and N=4)] is deposited into the 10 MHz radio channel. In FIG. 7, it can be seen that energy exists only in those intervals when the raised-cosine pulse exists and only in the frequency sub-bands 0.833-1.667 MHz, 4.167-5.000 MHz, and 7.500-8.333 MHz (i.e., the diagonally-striped blocks) in the channel. It will be clear to those skilled in the art, after reading this disclosure, how to determine where the energy associated with any waveform ϕ(m,n) is deposited for an M and N.

Figure 8:
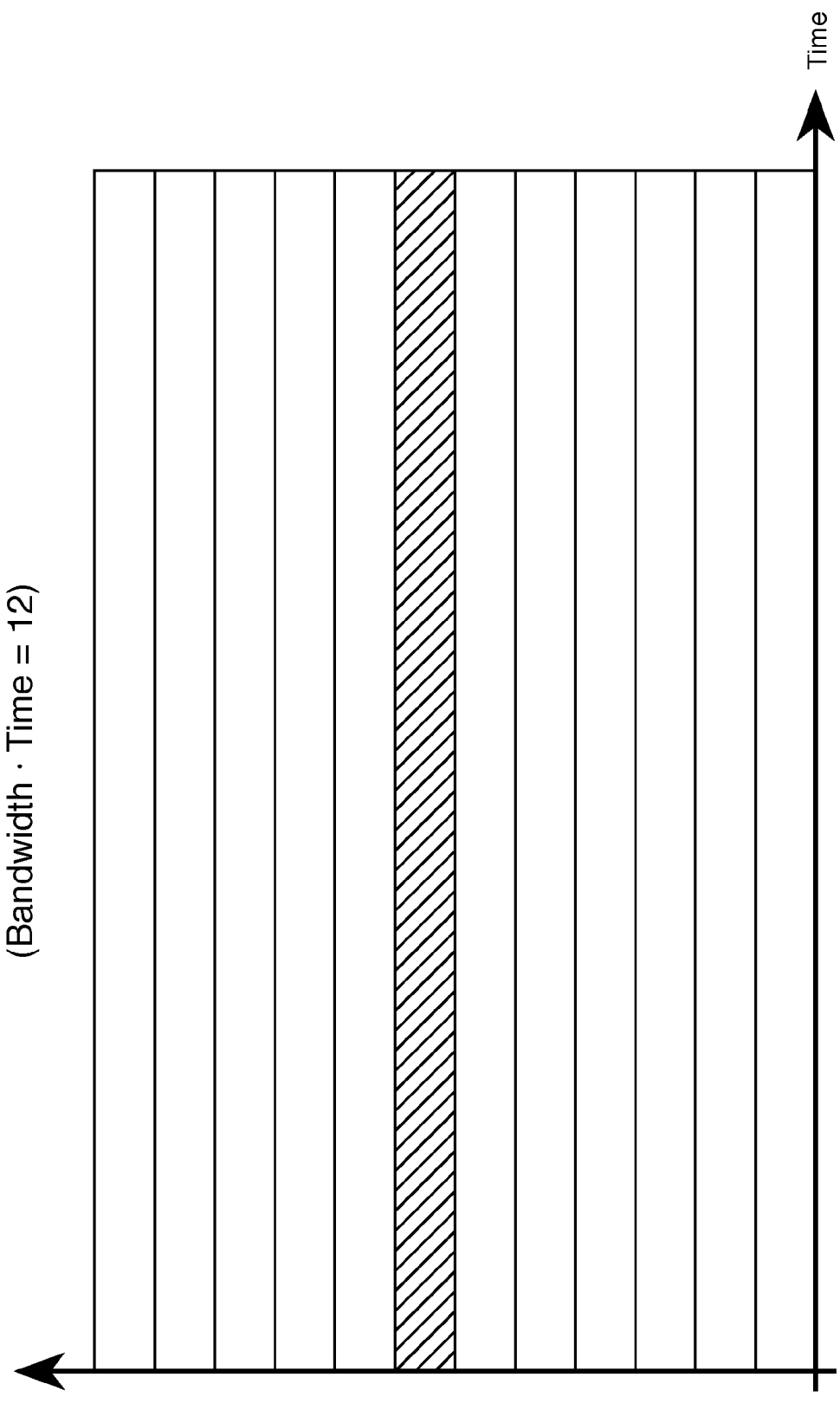
FIG. 8 depicts a time-frequency plot for the transmission of one data item in a frequency-division multiplexed/frequency-division multiple access ("FDM/FDMA") scheme.

For comparison, FIG. 8 depicts an analogous time-frequency plot for the transmission of one data item in a frequency-division multiplexed/frequency-division multiple access ("FDM/FDMA") scheme. In FIG. 8, the striped portion of the time-frequency plot indicates which portion of the channel is occupied by the waveform that transmits the data item.

Figure 9:
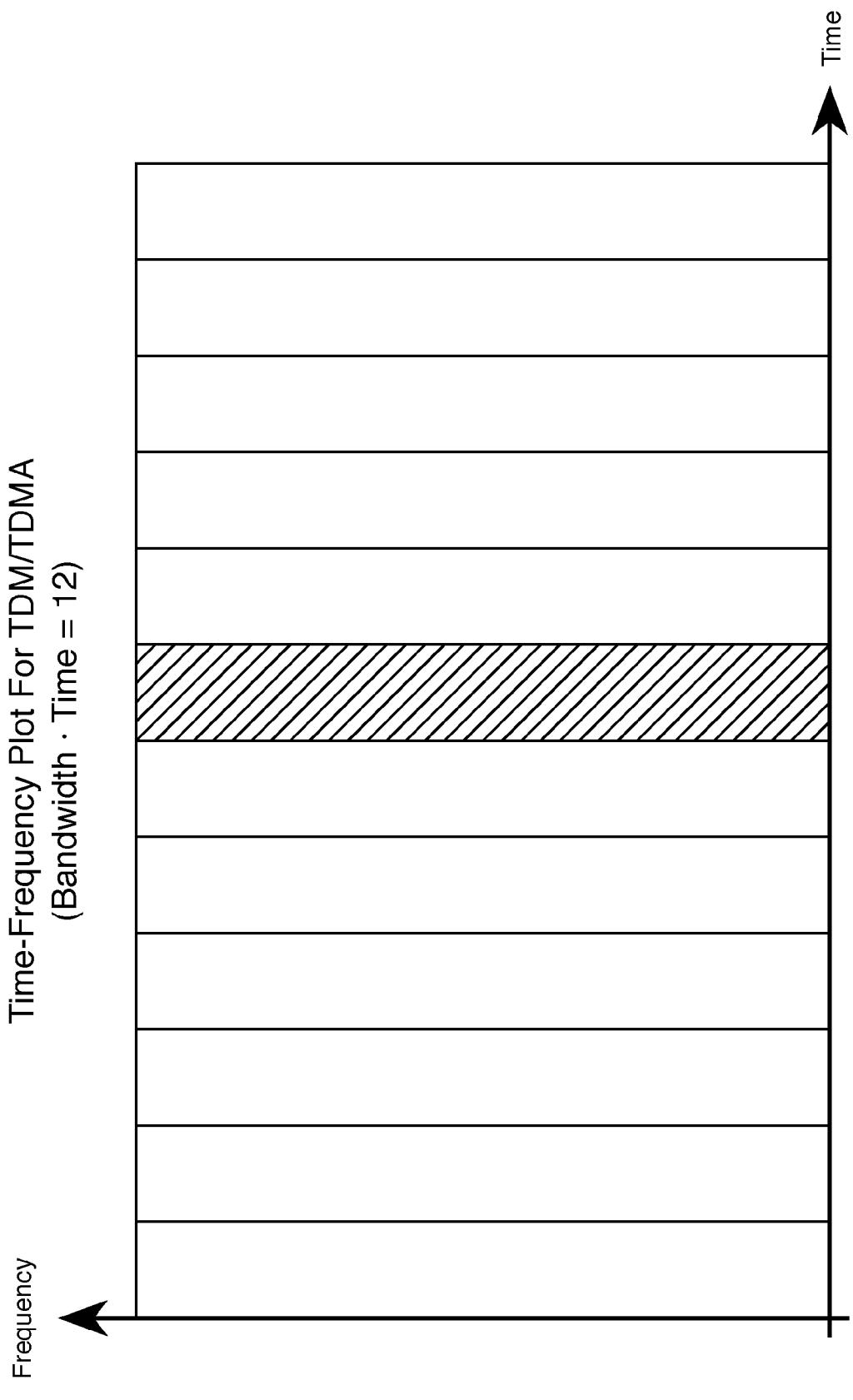
FIG. 9 depicts a time-frequency plot for the transmission of one data item in a time-division multiplexed/time-division multiple access ("TDM/TDMA") scheme.

As another example, FIG. 9 depicts an analogous time-frequency plot for the transmission of one data item in a time-division multiplexed/time-division multiple access ("TDM/TDMA") scheme. In FIG. 9, the striped portion of the time-frequency plot indicates which portion of the channel is occupied by the waveform that transmits the data item.

Figure 10:
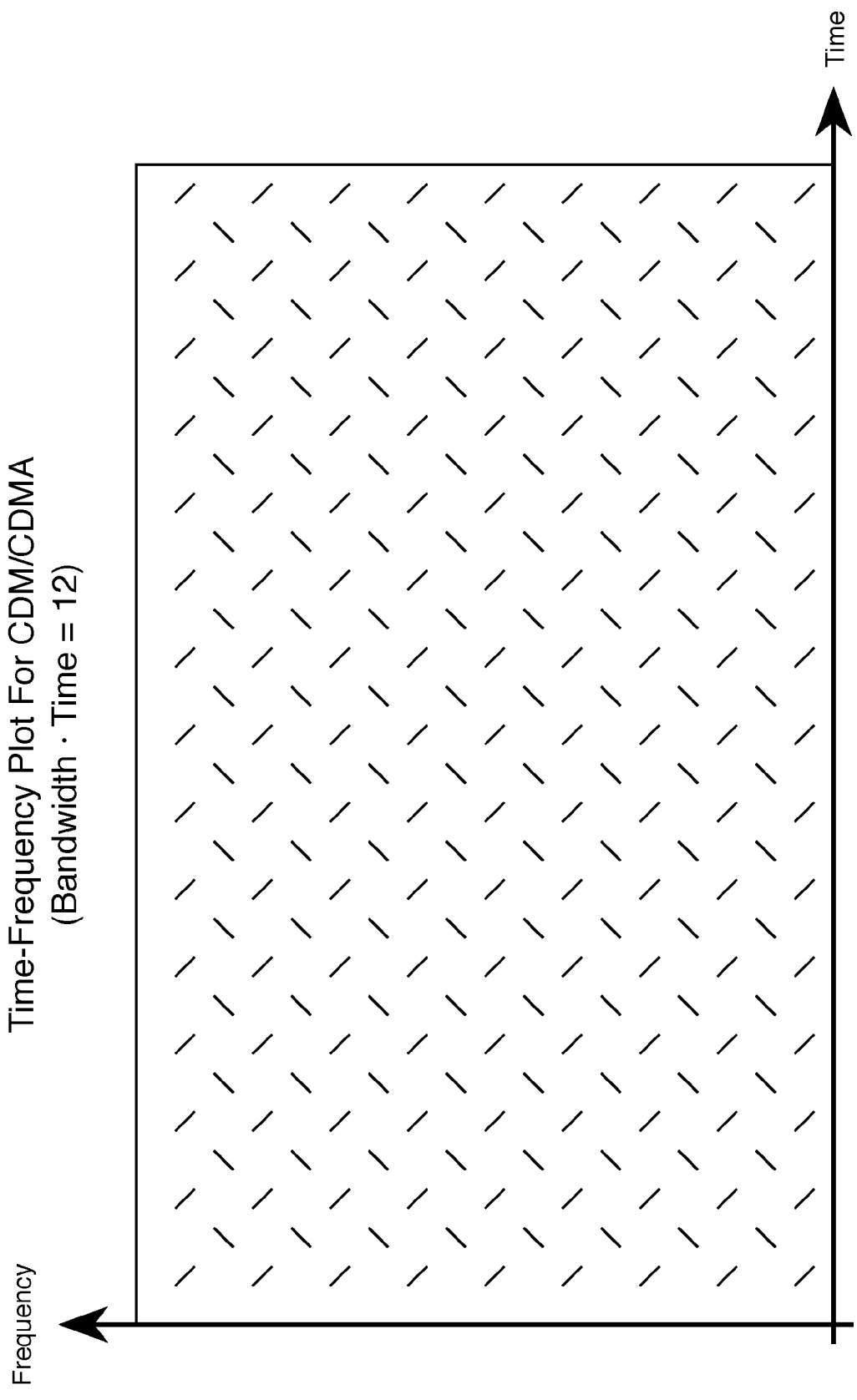
FIG. 10 depicts a time-frequency plot for the transmission of one data item in a code-division multiplexed/code-division multiple access ("CDM/CDMA") scheme.

As another example, FIG. 10 depicts a time-frequency plot for the transmission of one data item in a code-division multiplexed/code-division multiple access ("CDM/CDMA") scheme. In FIG. 10, the entire time-frequency plot is partially striped to indicate that energy is deposited throughout all of the channel all of the time by the waveform that transmits one data item.

Figure 11:
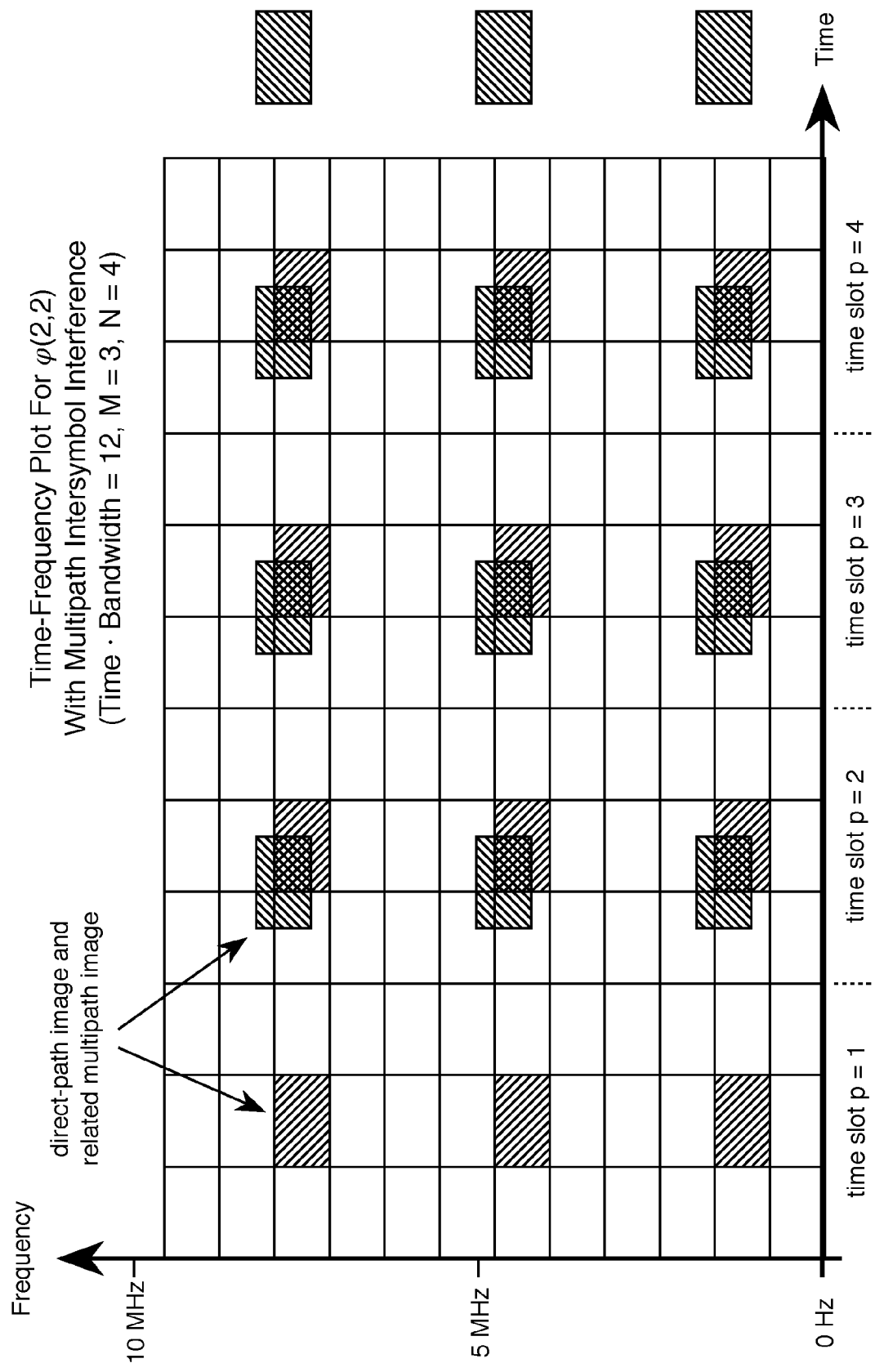
FIG. 11 depicts a time-frequency plot in which a Doppler-shifted multipath image of waveform $\phi(2,2)$ causes infrasymbol interference.

FIG. 11 depicts a plot of where the energy associated with waveform ϕ(2,2) [in waveform array Φ (M=3 and N=4)] is received from the 10 MHz radio channel. In particular, FIG. 11 depicts:

(i) a direct-path image of waveform ϕ(2,2), and
 (ii) a Doppler-shifted multipath image of waveform ϕ(2, 2).

From FIG. 11, it can be seen the Doppler-shifted multipath image partially overlaps—and causes infrasymbol interference to—the direct-path image. Furthermore, the Doppler-shifted multipath image partially overlaps—and causes intersymbol interference to the direct-path images of waveforms ϕ(1,2), ϕ(1,3), and ϕ(3,2). When the receiver can discriminate between the direct-path and multipath images, the infrasymbol interference can be avoided and the intersymbol interference can be eliminated.

Figure 12:
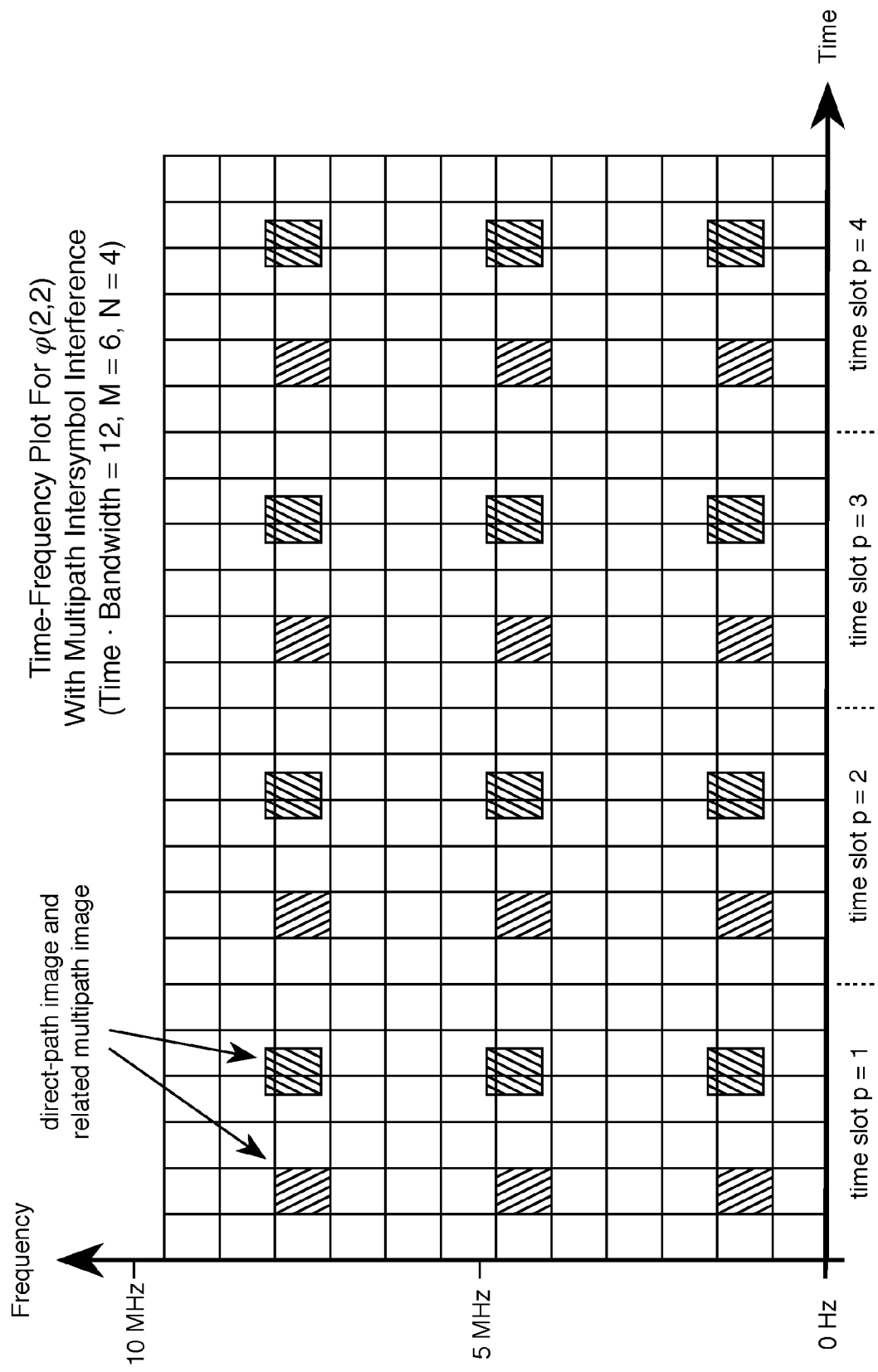
FIG. 12 depicts a time-frequency plot in which a Doppler-shifted multipath image of waveform $\phi(2,2)$ does not cause infra-symbol interference given the same delay spread as in FIG. 11.

In particular, the ability of embodiments of the present invention to discriminate between direct-path and multipath images of waveform ϕ(m,n) is a function of the values of M and N. In general, larger values of M and N enable higher resolution, and, therefore, greater discrimination between direct-path and multipath images. In particular, larger values of M enable greater discrimination in frequency (i.e., between Doppler-shifted images) and larger values of N enable greater discrimination in time (i.e., between delayed images). As a general rule of thumb, values of M should be much larger than the largest expected delay spread in the radio channel and values of N should be larger than the largest expected Doppler-shift in the radio channel. It will be clear to those skilled in the art, after reading this disclosure, how to make and use alternative embodiments of the present invention with any value of M, any value of N, and a set of M basic waveforms b(1), . . . , b(M). FIG. 12 depicts a time-frequency plot in which a Doppler-shifted multipath image of waveform ϕ(2,2) does not cause infra-symbol interference given the same delay spread as in FIG. 11.

At task 202, radio 101 generates the complete set of M·N waveforms of waveform array Φ, ϕ(1,1), . . . , ϕ(m,n), . . . , ϕ(M,N), in accordance with the parameters established in task 201.

At task 203, radio 101 receives up to M·N data items for transmission to radio 102. As part of task 203, radio 101 establishes a one-to-one relationship between each data item and each waveform ϕ(m,n) in waveform array Φ. In particular, the data item that corresponds to waveform ϕ(m,n) is designated d(m,n). It will be clear to those skilled in the art, after reading this disclosure, how to make and use embodiments of the present invention that perform task 203.

At task 204, radio 101 modulates a radio-frequency carrier signal with the data items to generate a modulated radio-frequency carrier signal. In particular, the radio-frequency carrier signal is modulated by:

$$\Sigma \phi(m,n) \cdot d(m,n)$$

for all of the data items that were received in task 203. It will be clear to those skilled in the art, after reading this disclosure, how to make and use embodiments of the present invention that perform task 204.

At task 205, the modulated radio-frequency carrier signal is transmitted/radiated into the radio channel via an antenna for reception by radio 102.

At task 206, radio 102 receives the modulated radio-frequency carrier signal and demodulates it using M·N matched filters, in well-known fashion, to recover the each of the data items that were transmitted by radio 101.

MARKMAN DEFINITIONS

Orthogonal—For the purpose of this specification, two waveforms are orthogonal if their inner product is zero over the time interval of interest.

What is claimed is:

1. A process comprising:
   receiving a data item d(1,1) and a data item d(1,2);
   generating a waveform φ(1,1) and a waveform φ(1,2) wherein:
   (i) the waveform φ(m,n) is partitioned into N time slots 1, . . . , p, . . . , N,
   (ii) time slot p of the waveform φ(m,n) comprises a basic waveform b(m) multiplied by exp[2n(n−1)(p−1)i/N],
   (iii) the waveform φ(m,n) is multiplied by the data item d(m,n),
   (iv) M and N are positive integers greater than 1,
   (v) m is a positive integer in the range m∈{1, . . . , M}, and
   (vi) n and p are positive integers in the range n∈{1, . . . , N};
   modulating a radio-frequency carrier signal with the sum of the waveform φ(1,1) and the waveform φ(1,2) to generate a modulated radio-frequency carrier signal; and
   radiating the modulated radio-frequency carrier signal into a radio channel via an antenna.

2. The process of claim 1 wherein j and k are positive integers in the range m∈{1, . . . , M}, and
   wherein basic waveform b(j) and basic waveform b(k) are orthogonal for j≠k.

3. The process of claim 1 wherein the basic waveform b(m) is waveform m in an M-ary stepped-pulse waveform scheme.

4. The process of claim 1 wherein the bandwidth of the radio channel is B Hz, and the duration of the basic waveform b(m) is M/B seconds.

5. The process of claim 1 wherein the bandwidth of the radio channel is B Hz, and the duration of the waveform φ(m,n) is M·N/B seconds.

6. A process comprising:
   receiving a data item d(1,1) and a data item d(2,1);
   generating a waveform φ(1,1) and a waveform φ(2,1) wherein:
   (i) the waveform φ(m,n) is partitioned into N time slots 1, . . . , p, . . . , N,
   (ii) time slot p of the waveform φ(m,n) comprises a basic waveform b(m) multiplied by exp[2n(n−1)(p−1)i/N],
   (iii) the waveform φ(m,n) is multiplied by the data item d(m,n),
   (iv) M and N are positive integers greater than 1,
   (v) m is a positive integer in the range m∈{1, . . . , M}, and
   (vi) n and p are positive integers in the range n∈{1, . . . , N};
   modulating a radio-frequency carrier signal with the sum of the waveform φ(1,1) and the waveform φ(1,2) to generate a modulated radio-frequency carrier signal; and
   radiating the modulated radio-frequency carrier signal into a radio channel via an antenna.

7. The process of claim 6 wherein j and k are positive integers in the range m∈{1, . . . , M}, and
   wherein basic waveform b(j) and basic waveform b(k) are orthogonal for j≠k.

8. The process of claim 6 wherein the basic waveform b(m) is waveform m in an M-ary stepped-pulse waveform scheme.

9. The process of claim 6 wherein the bandwidth of the radio channel is B Hz, and the duration of the basic waveform b(m) is M/B seconds.

10. The process of claim 6 wherein the bandwidth of the radio channel is B Hz, and the duration of the waveform φ(m,n) is M·N/B seconds.

11. A process comprising:
    receiving a data item d(1,1) and a data item d(2,2);
    generating a waveform φ(1,1) and a waveform φ(2,2) wherein:
    (i) the waveform φ(m,n) is partitioned into N time slots 1, . . . , p, . . . , N,
    (ii) time slot p of the waveform φ(m,n) comprises a basic waveform b(m) multiplied by exp[2n(n−1)(p−1)i/N],
    (iii the waveform φ(m,n) is multiplied by the data item d(m,n),
    (iv) M and N are positive integers greater than 1,
    (v) m is a positive integer in the range m∈{1, . . . , M}, and
    (vi) n and p are positive integers in the range n∈{1, . . . , N};
    modulating a radio-frequency carrier signal with the sum of the waveform φ(1,1) and the waveform φ(1,2) to generate a modulated radio-frequency carrier signal; and
    radiating the modulated radio-frequency carrier signal into a radio channel via an antenna.

12. The process of claim 11 wherein j and k are positive integers in the range m∈{1, . . . , M}, and
    wherein basic waveform b(j) and basic waveform b(k) are orthogonal for j≠k.

13. The process of claim 11 wherein the basic waveform b(m) is waveform m in an M-ary stepped-pulse waveform scheme.

14. The process of claim 11 wherein the bandwidth of the radio channel is B Hz, and the duration of the basic waveform b(m) is M/B seconds.

15. The process of claim 11 wherein the bandwidth of the radio channel is B Hz, and the duration of the waveform φ(m,n) is M·N/B seconds.

16. A process comprising:
    receiving M·N data items d(1,1), . . . , d(m,n), . . . d(M,N);
    generating M·N waveforms φ(1,1), . . . , φ(m,n), . . . , φ(M,N), wherein
    (i) the waveform φ(m,n) is partitioned into N time slots 1, . . . , p, . . . , N,
    (ii) time slot p of the waveform φ(m,n) comprises a basic waveform b(m) multiplied by exp[2n(n−1)(p−1)i/N],
    (iii) the waveform φ(m,n) is multiplied by the data item d(m,n),
    (iv) M and N are positive integers greater than 1,
    (v) m is a positive integer in the range m∈{1, . . . , M}, and
    (vi) n and p are positive integers in the range n∈{1, . . . , N};
    modulating a radio-frequency carrier signal with the sum of M·N waveforms φ(1,1), . . . , φ(m,n), . . . , φ(M,N), to generate a modulated radio-frequency carrier signal; and
    transmitting the modulated radio-frequency carrier signal into a radio channel via an antenna.

17. The process of claim 16 wherein j and k are positive integers in the range m∈{1, . . . , M}, and
    wherein basic waveform b(j) and basic waveform b(k) are orthogonal for j≠k.

18. The process of claim 16 wherein the basic waveform b(m) is waveform m in an M-ary stepped-pulse waveform scheme.

19. The process of claim 16 wherein the bandwidth of the radio channel is B Hz, and the duration of the basic waveform b(m) is M/B seconds.

20. The process of claim 16 wherein the bandwidth of the radio channel is B Hz, and the duration of the waveform ɸ(m,n) is M·N/B seconds.

* * * * *